United States Patent [19]

Nakayama et al.

[11] Patent Number: 4,788,655

[45] Date of Patent: Nov. 29, 1988

[54] CONDITION CODE PRODUCING SYSTEM

[75] Inventors: Yozo Nakayama, Yokohama; Masahito Kubo, Sagamihara; Yuuichi Yawata, Chigasaki, all of Japan

[73] Assignee: Panafacom Limited, Yamato, Japan

[21] Appl. No.: 874,700

[22] Filed: Jun. 16, 1986

[30] Foreign Application Priority Data

Jun. 17, 1985 [JP] Japan .................................. 60-131051

[51] Int. Cl.$^4$ ................................................ G06F 7/38
[52] U.S. Cl. ...................................................... 364/748
[58] Field of Search ........................ 364/748, 715, 736; 340/146.2, 825.22

[56] References Cited

U.S. PATENT DOCUMENTS 4,377,846 3/1883 Yoshida .............................. 364/736
4,683,546 7/1987 Boney ................................. 364/748

FOREIGN PATENT DOCUMENTS 0097434 5/1985 Japan ................................. 364/748

Primary Examiner—Gary V. Harkcom
Assistant Examiner—Long Thanh Nguyen
Attorney, Agent, or Firm—Staas & Halsey

[57] ABSTRACT

A condition code producing system for an arithmetic unit which is controlled by a micro program and operate on binary floating point data produces a condition code having a plurality of bits and describing an attribute of the binary floating point data. The condition code producing system comprises: a storing device for storing each bit of the condition code; a device for producing a plurality of detection signals from values of predetermined bits of the binary floating point data. This data is transferred to a bus within the arithmetic unit by a micro instruction which involves a data transfer, where the micro instruction is one of a plurality of micro instructions constituting the micro program. The micro instruction comprises a condition control field constituted by a plurality of bits having values depending on at least precision and data portions of the binary floating point data which is transferred. The system also includes a device for producing a new condition code from the plurality of detection signals and the condition code already stored in the storing device depending on a value of the condition control field and for setting the new condition code in the storing device.

10 Claims, 9 Drawing Sheets

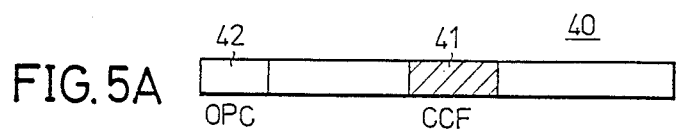

CONDITION CODE PRODUCING SYSTEM

BACKGROUND OF THE INVENTION

The present invention generally relates to condition code producing systems for an arithmetic unit. This unit is controlled by a micro program and operates on binary floating point data. The invention relates more particularly to a condition code producing system for checking operand data and operation result data and for setting, in an external condition register; a reserved value or the like which is the result of the checking.

There is a recent change in the floating point arithmetic operation. In other words, due to the notable progress in microprocessor technology, there is a trend toperform floating point arithmetic operations in the microprocessor. As a result, there is a move to set a standard related to the floating point arithmetic operations for the so-called microcomputers, and such a standard is being studied by The Institute of Electrical and Electronics Engineers (hereinafter referred to as IEEE).

According to the IEEE standard, various reserved values such as not-a-number, infinity, zero and a denormalized number are defined, and a processing method different from that of the conventional floating point arithmetic operation is required. However, if the standard related to these reserved values were to be accurately realized by use of the conventional technology, it would result in a slowdown of the arithmetic operation and an increase in the microsteps. Hence, there is a demand to realize an effective system for recognizing the reserved values.

Generally, there are two formats for the binary floating point data, that is, the single-precision format and the double-precision format. In each of the two formats, one binary floating point data is constituted by a sign portion S, an exponent portion EXP and a fraction portion FRAC. With respect to the binary floating point data, the IEEE defines the reserved values as follows.

| (1) Not-a-number: | EXP=All "1" and FRAC≠All "0"; |
|---|---|
| (2) Infinity: | EXP=All "1" and FRAC=All "0"; |
| (3) Zero: | EXP=All "0" and FRAC=All "0"; |
| (4) Denormalized number: | EXP=All "0" and FRAC≠All "0". |

When performing the binary floating point arithmetic operation, a condition is set by the sign portion S, a least significant bit (LSB) and the fraction portion FRAC being not equal to "0", and this condition will be referred to as an external condition in the present specification. The word "external" is used to mean external of an arithmetic logic unit (ALU).

When performing the binary floating point arithmetic operation, the arithmetic processing is performed depending on the external condition of the binary floating point data in a source operand and a destination operand, as will be described later on in the present specification. Accordingly, before performing the binary floating point arithmetic operation, it is necessary to check the external condition of the binary floating point data in the source operand and the destination operand, and furthermore, it is necessary to set the external condition of the binary floating point data, which is obtained as a result of the arithmetic operation, in a status register which can be checked by software.

However, according to the conventional method, the sign portion S, the exponent portion EXP and the fraction portion FRAC are separated by a mask processing of a micro instruction when checking the external condition of each of the binary floating point data. Then, each of the separated sign portion S, exponent portion EXP and fraction portion FRAC are subjected to an arithmetic operation, such as comparison with predetermined values such as data containing all "0" in accordance with the micro instruction. For this reason, there are problems in that the number of steps in the micro instruction becomes extremely large and it takes a long time to detect and process the external condition.

SUMMARY OF THE INVENTION

Accordingly, it is a general object of the present invention to provide a novel and useful condition code producing system in which the problems described heretofore are eliminated.

Another and more specific object of the present invention is to provide a condition code producing system for an arithmetic unit. This unit is controlled by a micro program and operates on binary floating point data, for producing a condition code having a plurality of bits and describing an attribute of the binary floating point data. The condition code producing system comprises: storing means for storing each of the condition code; detection signal producing means for producing a plurality of detection signals from values of predetermined bits of the binary floating point data. The data is transferred to a bus within the arithmetic unit by a micro instruction which involves a data transfer, where the micro instruction is one of a plurality of micro instructions constituting the micro program. The micro instructions comprises a condition control field constituted by a plurality of bits having values depending on at least precision and data portions of the binary floating point data which is transferred; and setting means for producing a new condition code from the plurality of detection signals and from the condition code already stored in the storing means depending on a value of the condition control field and for setting the new condition code in the storing means. According to the condition code producing system of the present invention, it is unnecessary to separate a sign portion S, an exponent portion EXP and a fraction portion FRAC of the binary floating point data by a mask processing of a micro instruction. Hence, the condition code can be produced at a high speed, that is, the detection of the external condition can be performed at a high speed.

Still another object of the present invention is to provide a condition code producing system in which the binary floating point data at least comprises destination operand and source operand, and the condition code comprises: a bit DS having a value dependent on a value of a sign portion of the destination operand; a bit SS having a value dependent on a value of a sign portion of the source operand; a bit L having a value dependent on a least significant bit of the binary floating point data; a bit NI indicating whether or not bits of an exponent portion of the binary floating point data are all "1"; a bit DN indicating whether or not bits of the exponent portion of the binary floating point data are all "0"; and a bit SNZ indicating whether or not bits of a fraction portion of the binary floating point data are not all "0". According to the condition code producing system of the present invention, it is possible to satisfactorily describe the attribute of the binary floating point data.

A further object of the present invention is to provide a condition code producing system in which the condition control field has different values for cases in which: the binary floating point data has a single-precision format or a double-precision format; the binary floating point data is the source operand data or the destination operand data; and the word transferred to the bus is a wordd in a most significant bit portion of the binary floating point data. According to the condition code producing system of the present invention, it is possible to recognize which bits of the bus supplied with the binary floating point data correspond to the sign portion, exponent portion and fraction portion.

Another object of the present invention is to provide a condition code producing system in which the setting means comprises: selecting means for producing the new condition code by selecting the plurality of detection signals or the already stored condition code depending on the value of the condition code field; logical sum arithmetic operation means for producing the new condition code by obtaining a logical sum of the plurality of detection signals and the already stored condition code depending on the value of the condition control field; and reset means for forcibly resetting the new condition code depending on the value of the condition control field. According to the condition code producing system of the present invention, it is possible to produce each of the bits of the condition code with an optimum format and set them in the storing means.

Still another object of the present invention is to provide a condition code producing system in which the micro instruction comprises an operation code having a value dependent on whether or not the setting of the storing means is permitted. A setting means sets the new condition code in the storing means only when the operation code has a value for permitting the setting of the storing means. According to the condition code producing system of the present invention, it is possible to prevent the condition code from changing when executing a micro instruction which involves a transfer of the binary floating point data to the bus, for example.

Other objects and further features of the present invention will be apparent from the following detailed description when read in conjunction with the accompanying drawings.

BRIEF DESCRIPTION OF THE DRAWINGS

FIG. 5A is a diagram for explaining the format of a micro instruction used in the condition code producing system according to the present invention;

FIG. 5B shows the relationship between the value of the condition control field and the data format;

FIG. 6 is a diagram for explaining a method of setting an external condition register;

DETAILED DESCRIPTION

FIGS. 1A and 1B show the formats of binary floating point data. FIG. 1A shows a single-precision format wherein one binary floating point data comprises 32 bits, and FIG. 1B shows a double-precision format wherein one binary floating point data comprises 64 bits.

Generally, in a microcomputer such as microprocessor, the width of a data bus is short and is only 16 bits, for example. Hence, in order to handle binary floating point data having single-precision format (32 bits) or double-precision format (64 bits), the data is usually divided into data portions, each portion having a width of 16 bits, before performing the actual arithmetic operation.

Figure 2:
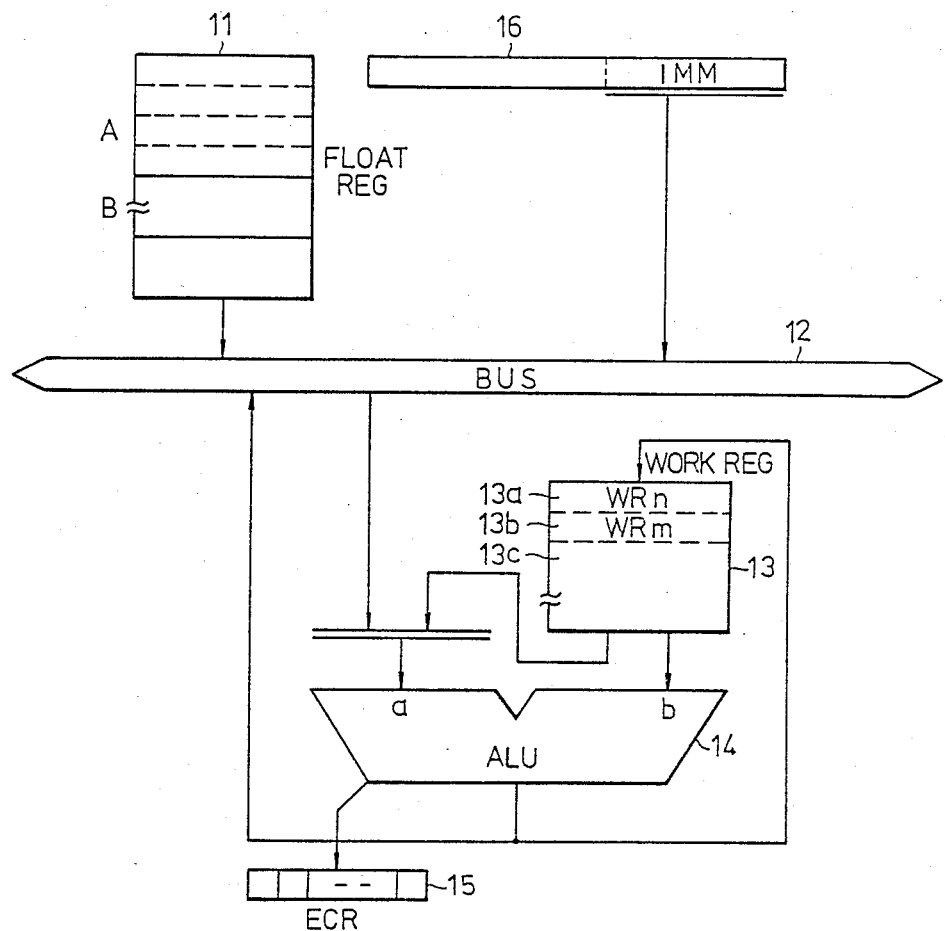
FIG. 2 is a system block diagram showing an example of the floating point arithmetic unit which employs the conventional system.

FIG. 2 is a system block diagram showing an example of the conventional arithmetic unit for performing the floating point arithmetic operation in a microcomputer according to a conventional system. Before performing an actual arithmetic operation, a source operand and a destination operand from a main memory device (not shown) are divided into portions of 16 bits, for example, and are entered into a floating register 11. In FIG. 2, an area A of the floating register 11 stores the source operand, and an area B stores the destination operand.

Figure 3:
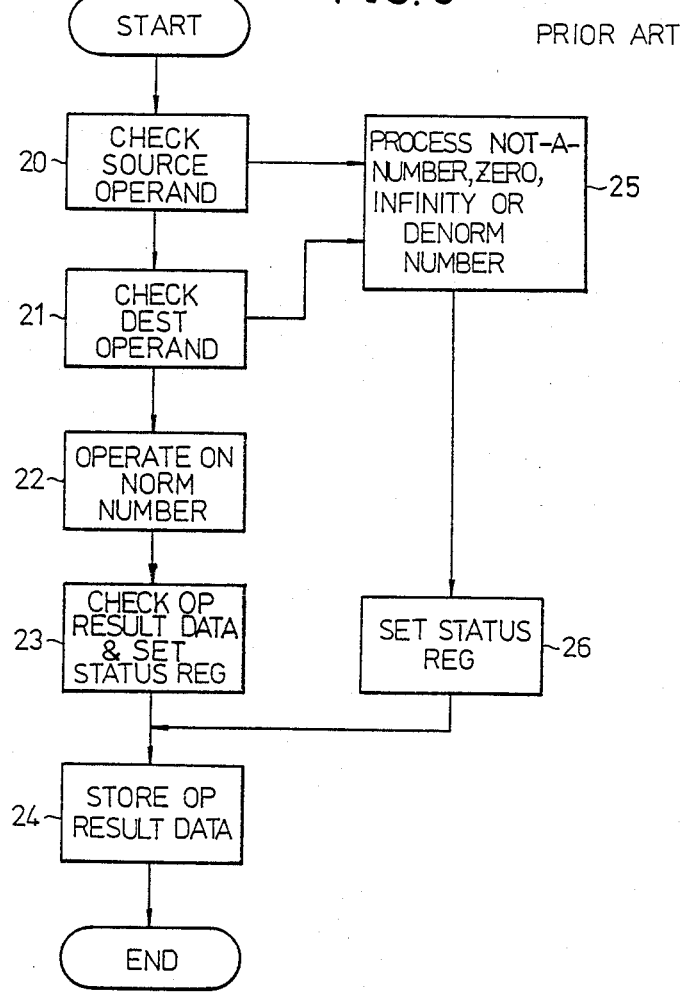
FIG. 3 is a flow chart showing an example of the operation of the floating arithmetic unit shown in FIG. 2.

FIG. 3 is a flow chart for explaining an example of the operation of the conventional arithmetic unit shown in FIG. 2. A general description will hereunder be given with respect to a conventional binary floating point arithmetic operation.

The source operand from the floating register 11, in portions of 16 bits, is entered into a work register 13 via an internal bus 12 by a fetch operation and is entered into an arithmetic logic unit (ALU) 14 as data b. Immediate data IMM of a micro instruction 16 are entered into the ALU 14 as data a. The processes which will be described later are performed in the ALU 14 so as to check the reserved values or the like. Hence, a step 20 shown in FIG. 3 checks the source operand. Similarly, the destination operand is entered into the work register 13 from the floating register by a fetch operation, and a step 21 checks the destination operand.

When it is recognized that both the source and destination operands do not correspond to one of: not-a-number, infinity, denormalized number or zero, that is, when the source and destination operands are normalized numbers, the operation advances to a step 22. On the other hand, when the source or destination operand is recognized as corresponding to one of: not-a-number, infinity, denormalized number or zero, the operation advances to a step 25.

The step 22 is performed when it is recognized that the source and destination operands are normalized numbers, and thus, the arithmetic operation instructed by the micro instruction 16 is performed in the ALU 14 after a fetch operation is performed and the source and destination operands are again entered into the work register 13.

A step 23 checks the external condition related to the operation result data which is obtained as a result of the binary floating point arithmetic operation, and produces a condition code. This condition code is set into predetermined bits of a status register (not shown).

A step 24 stores the operation result data into the area B of the destination operand of the floating register 11.

The step 25 is performed when it is recognized that one or both of the source and destination operands correspond to one of the reserved values: not-a-number, infinity, denormalized number and zero. Hence, the step 25 performs a process in accordance with the reserved value and the operation advances to a step 26.

When the source and/or destination operands are not normalized numbers, the step 26 sets a predetermined condition code in the status register described before. In this case, the sep 24 stores the operation result data into the area B of the destination operand of the floating register 11.

Figure 4:
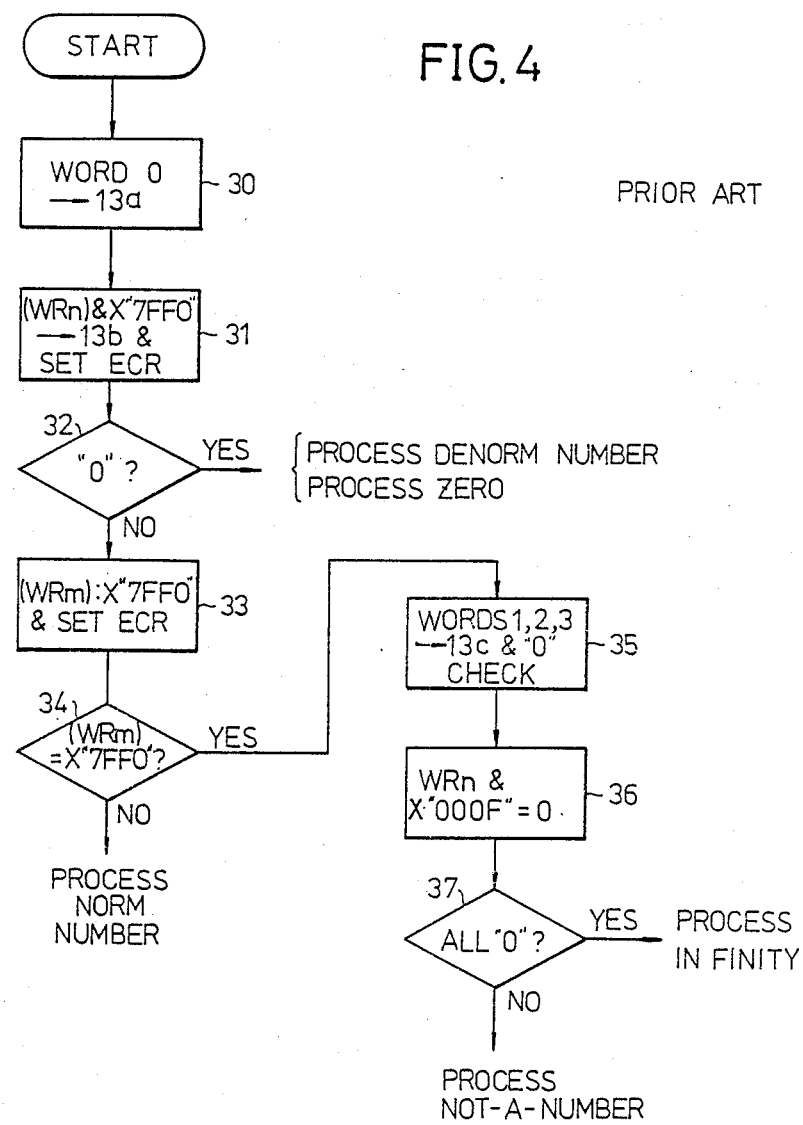
FIG. 4 is a flow chart for explaining a data check step shown in FIG. 3.

FIG. 4 shows in more detail the operation of the data check step 20 or 21 shown in FIG. 3. A step 30 performs a fetch operation and a word 0 in the floating register 11 is loaded into an area 13a of the work register 13. For example, in the case of the source and destination operands having the double-precision format, each operand is divided into four portions, each of 16-bits, and the word 0 is the first 16-bit data portion of the four, while the remaining three are words 1, 2 and 3.

Figure 1:
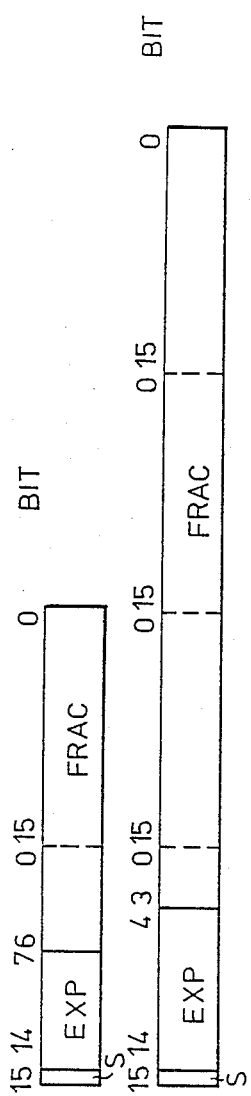
FIGS. 1A and 1B show formats of binary floating point data.

As is clear from the data format shown in FIG. 1, the word 0 comprises a part of the binary floating point data constituted by the sign portion S, the exponent portion EXP and the fraction portion FRAC. Hence, before performing the zero check on the exponent portion EXP, a step 31 enters the data WRn stored in the area 13a and the immediate data IMM of the micro instruction 16 into the ALU 14 and performs the logical multiplication (WRn) & X"7FF0" instructed by the micro instruction 16. In other words, a mask process is performed. Furthermore, the operation result data WRm is stored into an area 13b of the work register 13, and the external condition at this point in time is set at a predetermined position in an external condition register (ECR) 15 shown in FIG. 2.

A step 31 discriminates whether or not the operation result data obtained in the step 31 is "0" by checking the exponent portion EXP. When the discrimination result in the step 31 is YES, the operand is either a denormalized number or zero, and an appropriate process (not shown) is performed for each case to process the denormalized number or zero. On the other hand, when the discrimination result in the step 32 is NO, the operation advances to a step 33.

The step 33 enters the operation result data WRm stored in the area 13b and the immediate data IMM of the micro instruction 16 into the ALU 14 and performs a comparing operation (WRm): X"7FF0" instructed by the micro instruction 16. In addition, the external condition at this point in time is set at a predetermined position in the ECR 15. The comparing operation checks whether or not the bits of the exponent portion EXP are all "0".

After the compare, step 34 discriminates whether or not the data WRm and X"7FF0" coincide. When the discrimination result in the step 34 is YES, it means that the bits of the exponent portion EXP are all "1". In this case, it can be seen from the definition of the reserved values described before that the operand is not-a-number or infinity, and the operation advances to a step 35.

On the other hand, when the discrimination result in the step 34 is NO, it can be seen that the operand is a normalized number, and an appropriate process (not shown) is performed to process the normalized number.

The step 35 performs a fetch operation to enter each of the words 1, 2 and 3 described before (that is, the fraction portion FRAC of the source operand) into an area 13c and the like, and performs an operation to check whether or not the bits of the word are all "0" for each of the words 1, 2 and 3.

A step 36 performs a logical multiplication (Wrn) & X"000F" to check whether or not the fraction portion FRAC of the word 0, that is, the four least significant bits of the word 0, are all "0".

A step 37 discriminates whether or not all of the bits of the source operand are "0" by determining whether or not the bits are all zero in the steps 35 and 36. From the definition of the reserved values described before, it can be recognized that the source operand has the external condition of infinity when the discrimination result in the step 37 is YES. In this case, the external condition is set in the ECR 15, and an appropriate process (not shown) is performed to process the infinity. On the other hand, when not all of the bits are zero (FRAC $\neq$ all "0") in the steps 35 and 36 and the discrimination result in the step 37 is NO, it can be recognized that the source operand has the external condition of not-a-number, and in this case, the condition code of the external condition is set in the ECR 15 and an appropriate process (not shown) is performed to process the not-a-number.

Accordingly, the complex operations described heretofore must be performed to simply discriminate between not-a-number, infinity, zero and a denormalized number. This must be done for the source operand, and similar operations must be performed for the destination operand, and the operation result which is obtained as a result of the normalizing process.

FIG. 5A shows a format for a micro instruction 40 used in the condition code producing system according to the present invention. The micro instruction 40 comprises a condition control field (CCF) 41 indicated by hatchings and an operation code (OPC) 42 arranged at the beginning of the micro instruction 40. For example, the CCF 41 has three bits.

FIG. 5B shows the data format of the destination operand and the source operand in correspondence with the values of the CCF 41. The case where the value of the CCF 41 is "100" corresponds to the case where the destination operand has a single-precision format, and the case where the value of the CCF 41 is "101" corresponds to the case where the source operand has a single-precision format. On the other hand, the case where the value of the CCF 41 is "110" corresponds to the case where the destination operand has a double-precision format, and the case where the value of the CCF 41 is "111" corresponds to the case where the source operand has a double-precision format. In each of the four cases, the bits of the word 0, that is, the first 16 bits of the data are checked. In FIG. 5B, S denotes a sign portion, EXP denotes an exponent portion, and FRAC denotes a fraction portion.

Depending on the value of the CCF 41 of the micro instruction 40, an operation is performed to check whether the bits of the sign portion S and the exponent portion EXP are all "0" or all "1". For example, in the case where the bits of the exponent portion EXP are all "1", it is recognized that the data is the not-a-number or infinity, and a bit NI of an external condition register (ECR) 50 which will be described later is set to "1". On the other hand, in the case where the bits of the exponent portion EXP are all "0", it is recognized that the data is the denormalized number or zero, and a bit DN of the ECR 50 is set to "1". The value of the sign portion S is also checked similarly for each data, and a bit of the ECR 50 is set to "1" or reset to "0". The condition code describes the attributes of the binary floating point data including whether or not it is a reserved value (not-a-number, infinity, zero or denormalized number).

FIG. 6 is a diagram for explaining a method of setting the check result in the ECR 50. In FIG. 6, bits CCF0, CCF1 and CCF2 are bits of the CCF 41 arranged in the micro instruction 40 and indicate the value of the CCF 41. Bits DS, SS, L, NI, DN and SNZ of the condition code are stored in the ECR 50. The 1-bit check result of the sign portion S of the destination operand is set in the destination data sign bit DS. The 1-bit check result of the sign portion S of the source operand is set in the source data sign bit SS. The 1-bit check result of the LSB of the binary floating point data is set in the bit L. The 1-bit check result on whether or not the bits of the exponent portion EXP are all "1" is set in the not-a-number or infinity bit NI. The check result on whether or not the bits of the exponent portion EXP are all "0" is set in the denormalized number or zero bit DN. The 1-bit check result on whether or not the bits of the fraction portion FRAC are not all "0" is set in the sticky non zero bit SNZ.

In a first mode in which the CCF 41 has the value "000", the CCF 41 instructs the resetting of the bits L through SNZ to "0". In second and fourth modes in which the CCF 41 has the values "001" and "011", respectively, the CCF 41 instructs the setting of the bit SNZ in each of the words 1 through 3 of the destination and source operands to "1". In a third mode in which the CCF 41 has the value "010", the CCF 41 instructs the holding of the bits DS through SNZ. In fifth and sixth modes in which the CCF 41 has the values "100" and "101", respectively, the CCF 41 instructs the setting of the bits DS through SNZ of the word 0 of the destination and source operands having the single-precision format. In seventh and eighth modes in which the CCF 41 has the values "110" and "111", respectively, the CCF 41 instructs the setting of the bits DS through SNZ of the word 0 in the destination and source operands having the double-precision format.

The OPC 42 of the micro instruction 40 having the CCF 41 in any one of the first through eighth modes has a constant value, and the micro instruction 40 having the CCF 41 in any one of the first through eighth modes can be distinguished from other micro instructions.

Under the columns of the bits DS through SNZ in FIG. 6, it is indicated that the content of the ECR 50 is to be held even when the source operand, destination operand or the operation result data is checked when the content of the bit is described by the same designation as the bit name thereof. It is indicated that the bit is to be reset to "0" when the content thereof is "0". It is indicated that a most significant bit (MSB) of the data (that is, the sign portion S) which is checked is to be set to the same value that it is when the bit has the content F[15]. When the bit has the content F[14:7] or the like, it is indicated that the seventh through fourteenth bits of the word 0 described in FIG. 5A are to be checked and that the checked results are to be set in the corresponding bit positions of the ECR 50. It is indicated that the LSB of the data is to be set to the value it is when the bit has the content F[0]. When the bit has the content F[14:7]+NI or the like, it is indicated that the result obtained by performing a logical sum operation on the value already set in the ECR 50 and the present check result is to be set in the bit.

Accordingly, the word to be checked in the source operand, destination operand or the operation result data is designated by the content of the CCF 41 of the micro instruction 40, and furthermore, the method to be used in setting the check result in the ECR 50 is also designated by the content of the CCF 41 of the micro instruction 40.

Figure 7:
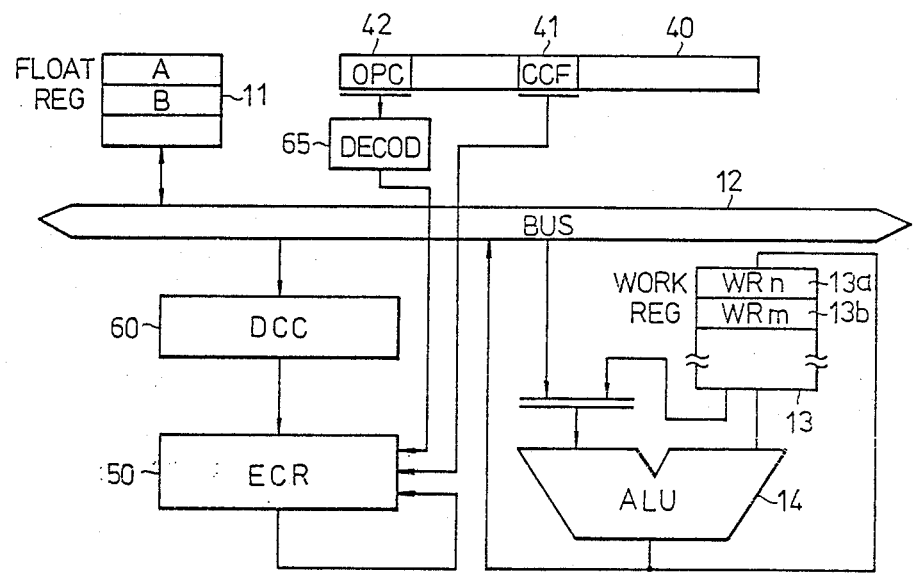
FIG. 7 is a system block diagram showing an embodiment of the floating point arithmetic unit which employs the condition code producing system according to the present invention.

FIG. 7 is a system block diagram showing an embodiment of the floating point arithmetic unit which employs a condition code producing system according to the present invention. In FIG. 7, those parts which are the same as those corresponding parts in FIG. 2 are designated by the same reference numerals, and description thereof will be omitted.

In FIG. 7, a data check circuit (DCC) 60 is coupled to the internal bus 12. The DCC 60 detects the states of bits BUS00 through BUS15 of the internal bus 12, and produces detection signals 14T7H, 14T4H, 14T7L, 14T4L, 6T0L and 3T0L. The output detection signals of the DCC 60 are supplied to the ECR 50. In addition to the detection signals, the ECR 50 is also supplied with the three bits CCF0, CCF1 and CCF2 of the CCF 41 of the micro instruction 40 and with a control signal MICRO which is obtained by decoding the value of the OPC 42 of the micro instruction 40 in a decoder 65. A new value is set in the ECR 50 depending on the value already set in the ECR and on the signals supplied thereto. The control signal MICRO has a value "1" when the micro instruction 40 comprising the OPC 42 which is decoded comprises the CCF 41 which is in one of the first through eighth modes.

Figure 8:
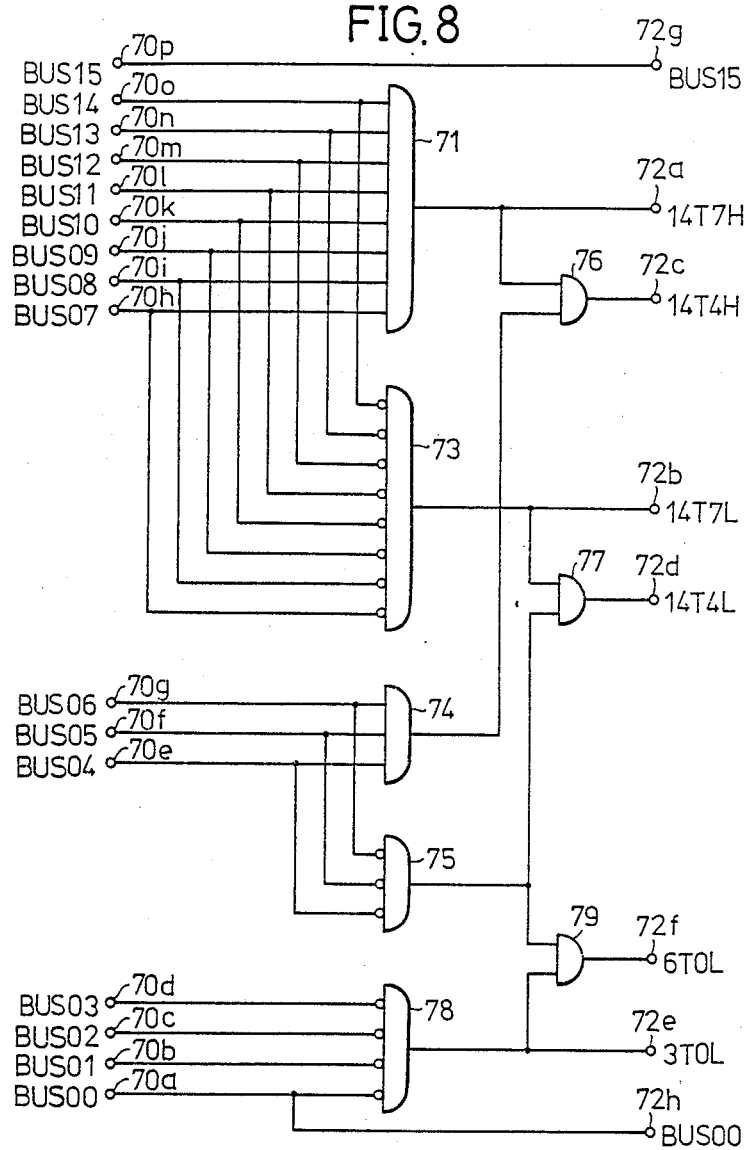
FIG. 8 is a circuit diagram showing an embodiment of a data check circuit in the floating point arithmetic unit shown in FIG. 7.

FIG. 8 is a circuit diagram showing an embodiment of the DCC 60. In FIG. 8, terminals 70a through 70p are respectively coupled to the lower 16 bits BUS00 through BUS15 of the internal bus 12. An AND circuit 71 produces the detection signal 14T7H which has a value "1" when all of the bits BUS07 through BUS14 are "1", that is, when all of the bits of the exponent portion EXP of the single-precision format floating point data are "1". The detection signal 14T7H is outputted via a terminal 72a. An AND circuit 73 produces a detection signal 14T7L which has a value "1" when all of the bits BUS07 through BUS14 are "0", that is, when all of the bits of the exponent portion EXP of the single-precision format floating point data are "0". The detection signal 14T7L is outputted via a terminal 72b.

An AND circuit 74 produces a signal which has a value "1" when all of the bits BUS04 through BUS06 are "1", and an AND circuit 75 produces a signal which has a value "1" when all of the bits BUS04 through BUS06 are "0". An AND circuit 76 produces from the output signals of the AND circuits 71 and 74 a detection signal 14T4H which has a value "1" when all of the bits of the exponent portion EXP of the double-precision format floating point data are "1". The detection signal 14T4H is outputted via a terminal 72c. An AND circuit 77 produces from the output signals of the AND circuits 73 and 75 a deflection signal 14T4L which has a value "1" when all of the bits of the exponent portion EXP of the double-precision format floating point data are "0". The detection signal 14T4L is outputted via a terminal 72d.

An AND circuit 78 produces a detection signal 3T0L when all of the bits BUS00 through BUS03 are "0", that is, when all of the upper four bits of the fraction portion FRAC of the double-precision format floating point data are "0". The detection signal 3T0L is outputted via a terminal 72e. An AND circuit 79 produces from the output signals of the AND circuits 75 and 78 a detection signal 6T0L which has a value "1" when all of the upper seven bits of the fraction portion FRAC of the single-precision format floating point data are "0". The detection signal 6T0L is outputted via a terminal 72f. The bits BUS15 and BUS00 are respectively outputted directly via terminals 72g and 72h.

Figure 9:
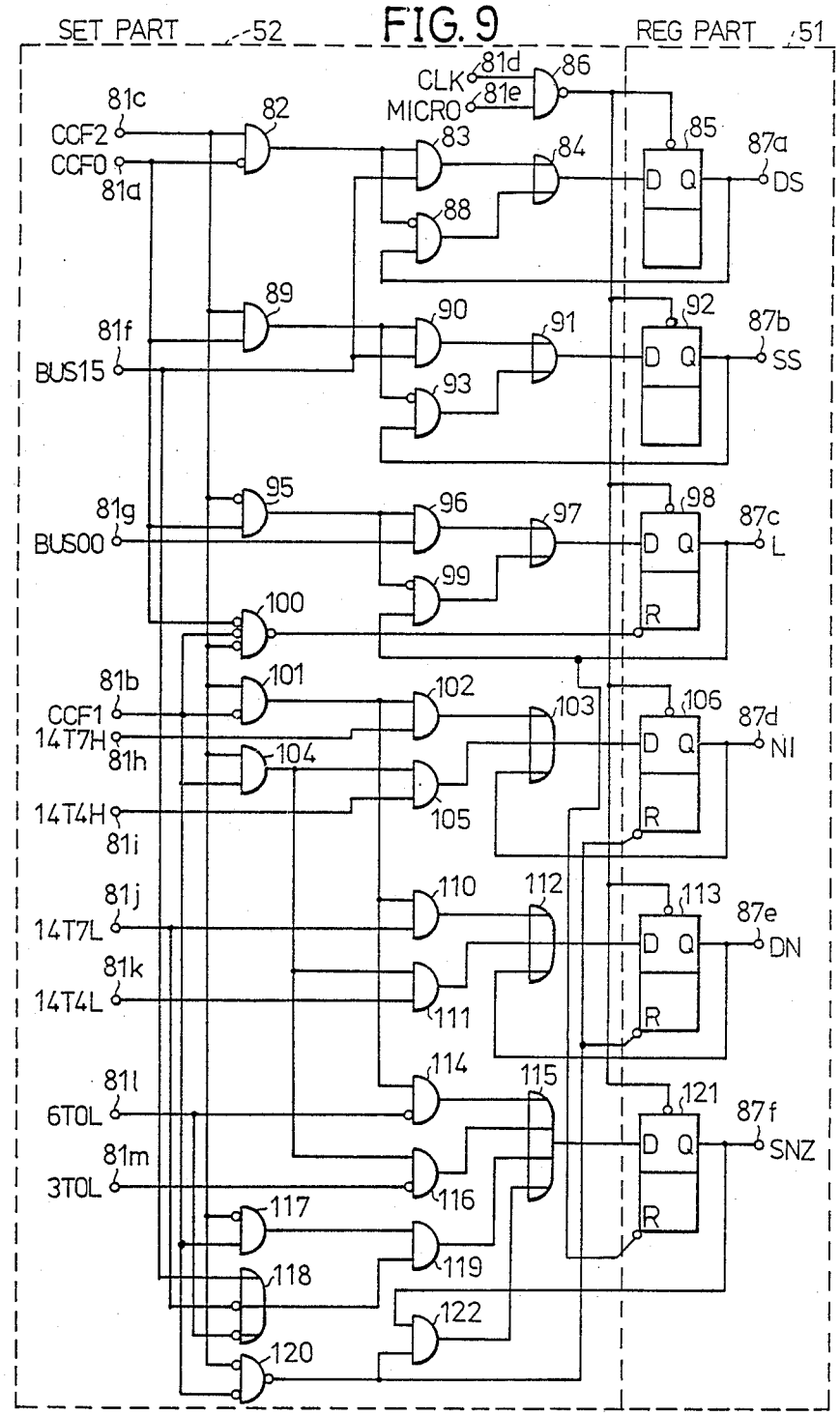
FIG. 9 is a circuit diagram showing an embodiment of the external condition register in the floating point arithmetic unit shown in FIG. 7.

FIG. 9 is a circuit diagram showing an embodiment of the ECR 50. In FIG. 9, the ECR 50 comprises a register part 51 for storing the bits DS through SNZ of the condition code for each bit, and a setting part 52 for producing a new condition code from the plurality of detection signals and the plurality of bits of the condition code stored in the register part 51 depending on the mode of the CCF 41 of the micro instruction 40 and for setting the new condition code in the register part 51. The bits CCF0, CCF1 and CCF2 of the CCF 41 are respectively applied to terminals 81a, 81b and 81c. A clock signal CLK and the control signal MICRO are respectively applied to terminals 81d and 81e. In addition, the bits BUS15 and BUS00 and the detection signals 14T7H, 14T4H, 14T7L, 14T4L, 6T0L and 3T0L are respectively applied to terminals 81f through 81m.

An AND circuit 82 produces a signal having a value "1" when the CCF 41 indicates the fifth or seventh mode shown in FIG. 6, and the bit BUS15 is passed through an AND circuit 83 and an OR circuit 84 and is supplied to a data input terminal D of a delay type flip-flop 85. When the control signal MICRO applied to the terminal 81e has the value "1", an output clock signal CLK of an AND circuit 86 is supplied to a clock input terminal of the flip-flop 85, and the value supplied to the data input terminal D is set as the value of the bit DS. The set value is outputted via a terminal 87a. In the first, second, third, fourth, sixth and eighth modes other than the fifth and seventh modes, the value of the bit DS produced from the flip-flop 85 is passed through an AND circuit 88 and the OR circuit 84 and is supplied to the data input terminal D of the flip-flop 85, and the value of the bit DS is again set in the flip-flop 85.

An AND circuit 89 produces a signal having a value "1" in the sixth and eighth modes of the CCF 41, and the bit BUS15 is passed through an AND circuit 90 and an OR circuit 91 and is set in a flip-flop 92 as the value of the bit SS. The set value is produced via a terminal 87b. In modes other than the sixth and eighth modes, the value of the bit SS produced from the flip-flop 92 is passed through an AND circuit 93 and the OR circuit 91 and is again set in the flip-flop 92.

An AND circuit 95 produces a signal having a value "1" in the second and fourth modes of the CCF 41, and the bit BUS00 is passed through an AND circuit 96 and an OR circuit 97 and is set in a flip-flop 98 as the value of the bit L. The set value is produced via a terminal 87c. In modes other than the second and fourth modes, the value of the bit L produced from the flip-flop 98 is passed through an AND circuit 99 and the OR circuit 97 and is again set in the flip-flop 98. Furthermore, a NAND circuit 100 produces a signal having a value "0" in the first mode of the CCF 41, and the flip-flops 98 and 121 are reset in this mode.

An AND circuit 101 produces a signal having a value "1" in the fifth and sixth modes of the CCF 41, and the detection signal 14T7H is supplied to an OR circuit 103 from an AND circuit 102. In addition, an AND circuit 104 produces a signal having a value "1" in the seventh and eighth modes of the CCF 41, and the detection signal 14T4H is supplied to the OR circuit 103 from an AND circuit 105. An output signal of a flip-flop 106 is supplied to the OR circuit 103, and logical sum of the detection signal 14T7H or 14T4H and the output value of the flip-flop 106 is set in the flip-flop 106 as the value of the bit NI. The set value in the flip-flop 106 is outputted via a terminal 87d.

Similarly, the detection signal 14T7L produced from an AND circuit 110 in the fifth and sixth modes of the CCF 41 and the detection signal 14T4L produced from an AND circuit 111 in the seventh and eighth modes of the CCF 41 are supplied to an OR circuit 112. The OR circuit 112 obtains a logical sum of the detection signals supplied thereto and an output value of a flip-flop 113, and this logical sum is set in the flip-flop 113 as the value of the bit DN. The set value in the flip-flop 113 is outputted via a terminal 87e.

Furthermore, an inverted signal of the detection signal 6T0L is supplied to an OR circuit 115 from an AND circuit 114 in the fifth and sixth modes of the CCF 41, and an inverted signal of the detection signal 3T0L is supplied to the OR circuit 115 from an AND circuit 116 in the seventh and eighth modes of the CCF 41. An AND circuit 117 produces a signal having a value "1" in the third and fourth modes of the CCF 41, and when one of the bits BUS00 through BUS15 has the value "1", a signal having a value "1" produced from an OR circuit 118 is supplied to the OR circuit 115 through an AND circuit 119. A NAND circuit 120 produces a signal having a value "0" in the first and second modes to reset flip-flops 106 and 113 and a value "1" in the third through eighth modes of the CCF 41, and an output value of a flip-flop 121 is supplied to the OR circuit 115 through an AND circuit 122. A logical sum of the output signals of the AND circuits 114, 116, 119 and 122 obtained in the OR circuit 115 is set in the flip-flop 121 as the value of the bit SNZ. The set value in the flip-flop 121 is outputted via a terminal 87f.

Figure 10:
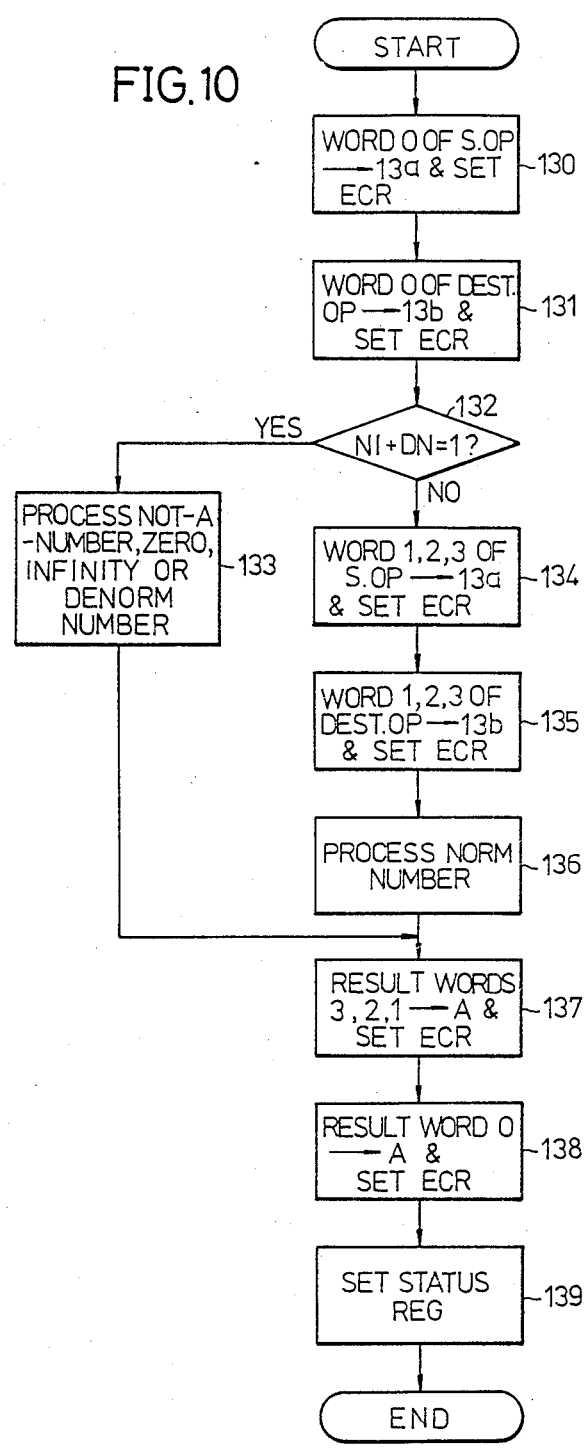
FIG. 10 is a flow chart showing an embodiment of the operation of the floating point arithmetic unit shown in FIG. 7.

FIG. 10 is a flow chart showing an embodiment of the operation of the floating point arithmetic unit shown in FIG. 7. In FIG. 10, a step 130 fetches the data in the floating register 11 and stores word 0 of the source operand into the area 13a or the like of the work register 13, and at the same time supplies each bit of the word 0 to the DCC 60. The content of the CCF 41 in correspondence with the source or destination operand for the cases where the data is a single-precision or double-precision format data is entered into the DCC 60 by the micro instruction 40. For example, in the case of the double-precision format source operand data, the CCF 41 has the value "111" as may be seen from FIG. 6, the bit BUS15, that is, F[15] of word 0 of the source operand instructed by the CCF 41 is checked, and as a result the bit SS of the ECR 50 is set. In addition, the bits BUS04 through BUS14 of the word 0, that is, F[14:4] are checked. When the bits BUS04 through BUS14 are all "1", the data is either not-a-number or infinity, and the bit NI of the ECR 50 is set accordingly. On the other hand, when the bits BUS04 through BUS14 are all "0", the data is either a denormalized number or zero, and the bit DN of the ECR 50 is set accordingly. In addition, the bits BUS00 through BUS03, that is, F[3:0] are checked, and the bit SNZ of the ECR 50 is set accordingly. The ECR 50 is reset before the step 130 is performed.

A step 131 fetches the data in the floating register 11 by the micro instruction 40 which comprises the CCF 41 having the value "110", and stores the word 0 of the destination operand into the area 13b of the word register 13. At the same time, the bits DS, NI, DN and SNZ of the ECR 50 are set to the values discussed above.

A step 132 discriminates whether or not at least one of the bits NI and DN of the ECR 50 is "1". One of or both the source and destination operands are other than the normalized number when the discrimination result in the step 132 is YES. Hence, in this case, a step 133 is performed to appropriately process the not-a-number, infinity, zero or the denormalized number, and the operation advances to a step 137 which will be described later. On the other hand, when the discrimination result in the step 132 is NO, both the source and destination operands are normalized numbers. Hence, the operation advances to a step 134 when the discrimination result in the step 132 is NO.

The step 134 successively fetches the data in the floating register 11 by the micro instruction 40 which comprises the CCF 41 having the value "011", and stores the words 1, 2 and 3 of the source operand into the area 13a of the word register 13. In addition, the bits L and SNZ of the ECR 50 are set accordingly.

A step 135 successively fetches the data in the floating register 11 by the micro instruction 40 which comprises the CCF 41 having the value "011", and stores the words 1, 2 and 3 of the destination operand into the area 13b of the work register 13. Further, the bits L and SNZ of the ECR 50 are set accordingly.

Each of the steps 134 and 135 actually comprise three steps in the case of the double-precision format data. However, each of the steps 134 and 135 can be performed in one step in the case of the single-precision format data, and for this reason, the steps 134 and 135 are respectively shown as one step in FIG. 10. In the steps 131, 134 and 135, the bits NI, DN and SNZ of the ECR 50 are respectively set in accordance with the logical sum arithmetic operation, as may be seen from FIG. 6.

For example, when the external condition of the source operand is recognized as being not-a-number, infinity, zero or denormalized number, and the condition code thereof is set at a certain bit position in the ECR 50, but the condition code which is the check result of the destination operand is thereafter set at the same bit position in the ECR 50, the check result of the source operand will be lost. Accordingly, the logical sum arithmetic operation described before is performed to set the bits of the ECR 50. As a result, in the case where one of or both the source and destination operands are other than the normalized number, the bits NI and DN Of the ECR 50 are set to "1".

A step 136 uses the source and destination operand data which have been stored in the areas 13a and 13b or the like of the work register 13 in the steps 130, 131, 134 and 135 and performs the floating point arithmetic operation in the ALU 14 as in the case of the conventional system. The operation result data of the arithmetic operation is stored in a specific area within the work register 13.

The step 137 successively fetches the data in the work register 13 by the micro instruction 40 which comprises the CCF 41 having the value "001", and stores the words 3, 2 and 1 of the operation result data into the area B of the floating register 11. In addition, the bits L and SNZ of the ECR 50 are set accordingly.

A step 138 fetches the data in the work register 13 by the micro instruction 40 which comprises the CCF 41 having the value "110", and stores the word 0 of the operation results data into the area A of the floating register 11. At the same time, the bits DS, NI, DN and SNZ of the ECR 50 are set accordingly.

A step 139 sets the condition code stored in the ECR 50 into a status register (not shown), and the series of floating point arithmetic operations are completed. It is possible to access the content of the status register by software.

When transferring the source or destination operand from the floating register 11 to the work register 13, the operation result data is transferred from the work register 13 to the floating register 11, and at the same time, the condition code for each operation result data is produced. For this reason, the steps to perform the mask processing and the comparing operation which are conventionally required can be eliminated according to the present invention. Therefore, the condition code can be produced at a high speed, that is, the detection of the external condition can be performed at a high speed.

Further, the present invention is not limited to these embodiments, but various variations and modifications may be made without departing from the scope of the present invention.

What is claimed is:

1. A condition code producing system for an arithmetic unit having a bus, said arithmetic unit being controlled by a micro program of microinstructions and operating on precision and data portions of binary floating point data, said condition code producing system producing a condition code having a plurality of bits and describing an attribute of the binary floating point data, said condition code producing system comprising:
   storing means for storing each bit of the condition code;
   detection signal producing means for producing a plurality of detection signals from values of predetermined bits of the binary floating point data transferred to said bus within said airthmetic unit by an executing micro instruction performing data transfer, the executing micro instruction being one of the micro instructions constituting said micro program, the executing micro instruction comprising a condition control field constituted by a plurality of bits having values depending on at least the precision and data portions of the binary floating point data being transferred; and
   setting means for producing a new condition code from said plurality of detection signals and from the condition code already stored in said storing means depending on a value of said condition control field and for setting said new condition code in said storing means.

2. A condition code producing system as claimed in claim 1, wherein said binary floating point data includes at least one of a destination operand and a source operand; and
   wherein said setting means includes means for providing said condition code comprising a bit DS having a value dependent on a value of a sign portion of said destination operand, a bit SS having a value dependent on a value of a sign portion of said source operand, a bit L having a value dependent on a least signficant bit of said binary floating point data, a bit NI indicating whether bits of an exponent portion of said binary floating point data are all "1", a bit DN indicating whether bits of the exponent portion of said binary floating point data are all "0" and a bit SNZ indicating whether bits of a fraction portion of said binary floating point data are not all "0".

3. A condition code producing system as claimed in claim 1, wherein said binary floating point data comprises a plurality of words, said system further comprising transfer means for transferring said binary floating point data to said bus in units of one word by the executing micro instruction performing data transfer.

4. A condition code producing system as claimed in claim 3,
wherein said condition control field has different values determined in dependence upon said binary floating point data having one of a single-precision format and a double-precision format and inclusion of data corresponding to only one of the source operand and the destination operand in said binary data, and
wherein said transfer means includes means for transferring to said bus the most significant bit portion of said binary floating point data.

5. A condition code producing system as claimed in claim 1 in which said condition control field has three bits.

6. A condition code producing system as claimed in claim 1 in which said storing means comprises a plurality of flip-flop means for storing each of the bits of the condition code.

7. A condition code producing system as claimed in claim 1, wherein said setting means comprises:
selecting means for determining bit values in the new condition code in accordance with selected ones of said detection signals, the already stored condition code and the value of said condition control field;
logical sum arithmetic operation means for determining bit values in the new condition code by obtaining a logical sum of said plurality of detection signals and the already stored condition code for a first predetermined value of said condition control field; and
reset means for forcibly resetting said new condition code for a second predetermined value of said condition control field.

8. A condition code producing system as claimed in claim 7, wherein said selecting means includes means for producing bits DS, SS, and L of the new condition code,
wherein said logical sum arithmetic operation means includes means for producing bits NI, DN and SNZ of the new condition code, and said reset means includes means for resetting the bits L, NI, DN and SNZ of the new condition code.

9. A condition code producing system as claimed in claim 1 in which said micro instruction comprises an operation code having a value dependent on whether the setting of said storing means is permitted.

10. A condition code producing system as claimed in claim 9, wherein said setting means includes means for setting the new condition code in said storing means only when said operation code has a value for permitting the setting of said storing means.

* * * * *

UNITED STATES PATENT AND TRADEMARK OFFICE
CERTIFICATE OF CORRECTION

PATENT NO. : 4,788,655

DATED : November 29, 1988

INVENTOR(S) : Nakayama et al.

It is certified that error appears in the above-identified patent and that said Letters Patent is hereby corrected as shown below:

```
Front page [56], line 3, "3/1883" should be --3/1983--.
Col. 1,   line 17, "toperform" should be --to perform--.
Col. 2,   line 27, "each of" should be --each bit of--;
          line 35, "structions" should be --struction--.
Col. 3,   line 8, "wordd" should be --word--.
Col. 4,   line 12, delete "the";
          line 18, after "as" insert --a--.
```

Signed and Sealed this

Twenty-fifth Day of April, 1989

Attest:

DONALD J. QUIGG

*Attesting Officer*     Commissioner of Patents and Trademarks